(12) United States Patent
Igarashi

(10) Patent No.: US 6,706,168 B2
(45) Date of Patent: Mar. 16, 2004

(54) WASTEWATER TREATMENT METHOD AND APPARATUS

(76) Inventor: Takeshi Igarashi, 78-4 Shinoyama, Ishige-cho, Yuki-gun, Ibaraki (JP)

(*) Notice: Subject to any disclaimer, the term of this patent is extended or adjusted under 35 U.S.C. 154(b) by 83 days.

(21) Appl. No.: 09/963,277

(22) Filed: Sep. 26, 2001

(65) Prior Publication Data

US 2003/0057107 A1 Mar. 27, 2003

(51) Int. Cl.$^7$ ............................................. C02F 1/461
(52) U.S. Cl. .................. 205/744; 205/756; 205/771; 204/242; 204/272; 204/275.1; 204/229.4
(58) Field of Search .................. 205/744, 756, 205/771; 204/242, 272, 275.1, 229.4

(56) References Cited

U.S. PATENT DOCUMENTS

| 5,304,289 A | * | 4/1994 | Hayakawa | 204/149 |
| 5,326,446 A | * | 7/1994 | Binger | 204/305 |
| 5,435,894 A | * | 7/1995 | Hayakawa | 204/149 |

* cited by examiner

*Primary Examiner*—Arun S. Phasge
(74) *Attorney, Agent, or Firm*—Jordan and Hamburg LLP

(57) ABSTRACT

Wastewater treatment operations, i.e. the coagulation, decomposition, sterilization and separation of impurities such as the sludge, organisms, etc. in a liquid to be treated are carried out by applying an AC voltage of a specific frequency between first and second electrodes provided in the liquid to be treated, and thereby making an AC field work on the same liquid. An AC voltage of a high frequency suited to the quality of the water in a frequency band in which metal ions, hydrogen, and oxygen are dissolved into and are taken take out in large quantities, occurring in the AC electrolysis of the object liquid elute, and an AC voltage of a low frequency are switched from one to the other in a contactless manner in a predetermined cycle, and the resultant voltage is applied to the first and second electrodes. This causes crystals and bubbles in the water, and sludge, organisms, etc. to be fractionated, the decomposition, sterilization and separation thereof with respect to the water to be promoted, the oxidation-reduction potential and oxidation potential to be varied greatly, and the electrode self-cleaning effect by use of a low frequency AC to be produced simultaneously.

10 Claims, 3 Drawing Sheets

(a)

(b)

(c)

WASTEWATER TREATMENT METHOD AND APPARATUS

BACKGROUND OF THE INVENTION

1. Field of the Invention

This invention relates to a wastewater treatment method and apparatus effective in subjecting minute solid particles contained in a liquid to be treated to coagulation, separation, decomposition and sterilization. More particularly, the wastewater treatment method and apparatus according to the present invention have features adapted to the treatment of an object liquid by greatly varying the oxidation-reduction potential and oxidation potential by a field effect of a high frequency suited to each liquid to be treated, resulting in an electrochemical reaction, so as to fractionate minute solid particles in the object liquid and promote the decomposition, sterilization and separation of the fractionated particles with respect to the water.

2. Description of the Related Art

In a method of separating and removing minute solid particles from contaminated waste water and waste painting water, chemicals, such as a coagulant, a high molecular agent and the like have heretofore been used. The equipment for use in practicing this method is large and requires a large installation area. The equipment not only is expensive but also involves a high cost for its maintenance and management.

Recently, a wastewater treatment apparatus utilizing the electrolysis of water has been proposed. Although this kind of apparatus may possibly be smaller and requires a substantial amount of power, it harmonizes excellently with the environment. In a wastewater treatment in a related art utilizing apparatus for the electrolysis of water, an AC voltage of a low frequency of around 30 $H_z$–80 $KH_z$ is applied to electrodes. This apparatus does not have a satisfactory performance with respect to the fractionation of crystals in the water, the fouling of electrodes the fractionation of minute solid particles, the promotion of a particle separating effect with respect to the water, and, especially, the treatment of a large quantity of water.

SUMMARY OF THE INVENTION

The present invention has been made in view of the above-mentioned circumstances, and provides a wastewater treating method and apparatus adapted to easily treat water the quantity of which is as large as around ten times that of the water treated by a method in a related art, and apparatus of this kind, by generating an electrochemical reaction in the water being treated, fractionating minute solid particles and the like without using chemicals, improving a particle decomposing, sterilizing and separating effect promoting performance with respect to the water, and thereby greatly varying the oxidation-reduction potential and oxidation potential; and reducing the equipment installation area to a minimum level and running cost.

In the wastewater treatment method, in which impurities, such as sludge, organisms, etc. in a liquid to be treated are coagulated, decomposed, sterilized and separated by applying an AC voltage of a predetermined frequency between a first electrode and a second electrode provided in the object water, and thereby causing an AC field to work on the same water, the frequency of the AC voltage used is set to a high level suited to the quality of the water, in a frequency band in which metal ions, hydrogen, and oxygen are dissolved into and taken out in large quantities, occurring in AC electrolysis of the object liquid elute.

The method preferably has the following characteristics.

(1) When the liquid to be treated is underground water, a frequency in the vicinity of 310 KHz is used.

(2) When the liquid to be treated is city water, a frequency in the vicinity of 170 KHz is used.

(3) A third electrode is provided in a non-connected state in the liquid to be treated.

(4) The first and second electrodes are self-cleaned by using a low frequency in a frequency band in which metal ions, hydrogen, and oxygen are dissolved into and taken out in large quantities, occurring in the AC electrolysis of the object liquid elute.

(5) An AC voltage of a high frequency for causing an AC field to work on the object liquid and an AC voltage of a low frequency for self-cleaning the first and second electrodes are switched from one to the other in a contactless manner in a predetermined cycle, and the resultant AC voltage is applied to the electrodes.

The wastewater treatment apparatus of the invention is adapted to subject impurities, such as sludge, organisms, etc. in a liquid to be treated, to coagulation, decomposition, sterilization and separation by applying an AC voltage of a predetermined frequency between a first electrode and a second electrode provided in the liquid to be treated, thereby causing an AC field to work on the same liquid. Such apparatus includes an AC power source for generating an AC voltage set to a predetermined frequency, and a control unit for applying between the first and second electrodes an AC voltage of a high frequency suited to the quality of the water, in a frequency band in which metal ions, hydrogen, and oxygen are dissolved into and taken out in large quantities, occurring in the AC electrolysis of the object liquid elute. The apparatus is designed so as to fractionate the impurities by applying an AC field generated by the AC voltage of a high frequency to the object liquid, and thereby promote an efficient separation of the fractionated impurities from the water.

The apparatus preferably has the following components.

(1) The control unit applies an AC voltage of a high frequency which promotes the separation of the impurities from an object liquid by causing an AC field to work on the same liquid, thereby fractionating the impurities, and which is in a frequency band in which metal ions, hydrogen and oxygen are dissolved into and taken out in large quantities, during the AC electrolysis of the object liquid elute The control unit also applies an AC voltage of a low frequency to the first and second electrodes for self-cleaning such electrodes.

(2) The control unit switches the AC voltage of a high frequency and the AC voltage of a low frequency from one to the other in a contactless manner in a predetermined cycle, and applies the resultant AC voltage to the above-mentioned electrodes.

(3) The first and second electrodes are formed of multiple, coaxial pipe type electrodes.

(4) A third electrode is provided in a non-connected state in the liquid to be treated.

According to the present invention, the use of a high frequency suited to the quality of the water, in a frequency band in which metal ions, hydrogen, and oxygen are dissolved into and taken out in large quantities, occurring in the AC electrolysis of the liquid to be treated, causes crystals and bubbles in the water to be fractionated, sludge, organisms, etc. to be fractionated, the water decomposing, sterilizing and separating effects of the electrolysis to be increased, the oxidation-reduction potential and oxidation potential to be varied greatly, an electric field effect (vibration effect) based on the high frequency suited to the quality of the water to increase, and a water sterilizing effect to be thereby produced. Especially, when city water, underground water, etc. are used as drinking water and food manufacturing water, the safety thereof can be improved by sterilizing the same. In a sewage treatment, the sterilization thereof, the decomposition of chlorine compound and dioxin, COD(chemical oxygen demand) and the separation and decomposition of environment contaminating substances have enabled the prevention of river contamination and the recycling of sewage.

Since the self-cleaning of the electrodes is done by using a low frequency, the substances deposited thereon are removed therefrom, and the surface of electrodes are regenerated, thus enabling the water treatment efficiency to be improved.

Since a third electrode is provided in a non-connected state, the elution of the metal ions is further promoted, and the oxidation-reduction potential and oxidation potential are varied greatly.

Multiple coaxial pipe type electrodes are used as the first and second electrodes, therefore an aqueous solution having a low electrical conductivity can be electrolyzed with a high efficiency.

DESCRIPTION OF THE PREFERRED EMBODIMENTS

Figure 1:
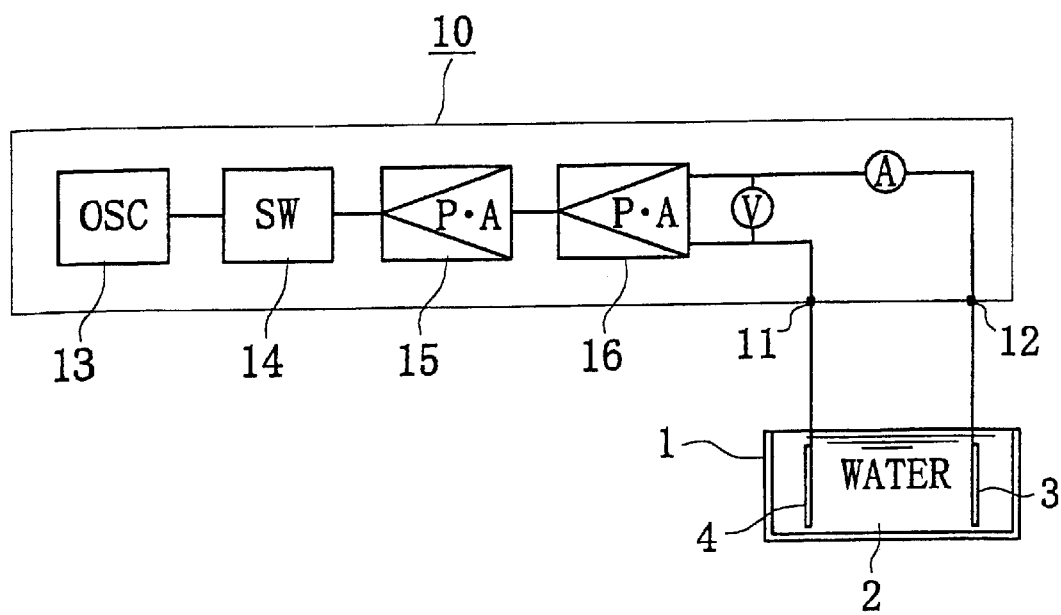
FIG. 1 is a block diagram of an electric circuit of the wastewater treatment apparatus according to the present invention.

Embodiments of the present invention will now be described with reference to the drawings. FIG. 1 is a block diagram of an electric circuit of the wastewater treatment apparatus according to the present invention. In a treatment vessel 1, a liquid 2 to be treated, such as environment contamination waste water and the like is placed, and a first electrode 3 and a second electrode 4 are inserted. The first and second electrodes 3, 4 are connected to output terminals 11, 12 of a frequency variable type AC power source 10. From the AC power source 10, an output, for example, 1 KW, of a variable frequency of several HZ to 1 MHz suitable for the electrolysis of the object liquid is obtained. The AC power source 10 includes a frequency generating circuit (OSC) 13, a switching circuit (SW) 14 for switching frequencies from one to the other in a predetermined cycle, and a power amplifier circuit formed of a first power amplifier circuit member (P.A.) 15 and a second power amplifier circuit member (P.A.) 16.

The switching circuit 14 constitutes a control unit adapted to carry out a switching control operation for switching from one to the other in a contactless manner in a predetermined cycle an AC voltage of a high frequency which makes an AC field work on the liquid to be treated, fractionates impurities and promotes the separation, decomposition and sterilization of the resultant impurities with respect to the water, and which is in a frequency band in which an electrochemical reaction is generated with metal ions eluting in the AC electrolysis of the object liquid, and an AC voltage of a low frequency for self-cleaning a first electrode 3 and a second electrode 4.

The second power amplifier circuit member 16 is connected to the output terminals 11, 12, and an AC power of a predetermined frequency and a predetermined output level is supplied between the first and second electrodes 3, 4 via these output terminals. The current and voltage supplied to the electrodes 3, 4 can be ascertained in an ammeter A and a voltmeter V respectively.

Figure 2:
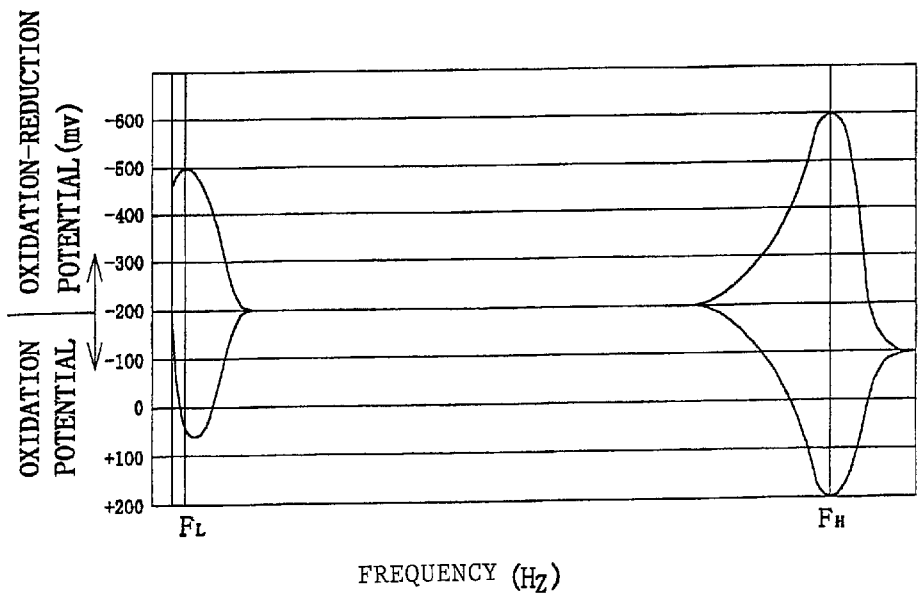
FIG. 2 is a diagram showing the relation between oxidation-reduction potential and oxidation potential and frequencies.

FIG. 2 shows the relation between oxidation-reduction potential and oxidation potential and frequencies. The maximum variation values of the oxidation-reduction potential and oxidation potential are shown between two points of specific frequencies $F_1$ and $F_2$, and an ionization effect and electrochemical reaction effect appears noticeably. A low frequency $F_L$ is suitable for the self-cleaning of the electrodes, and has an effect in greatly varying the oxidation-reduction potential and oxidation potential while self-cleaning the electrodes. A high frequency $F_H$ generates fine bubbles, and has a large field effect. A high frequency also has an effect in greatly varying the oxidation-reduction potential and oxidation potential by fractionating crystals in the water, fractionating sludge, organisms, etc. and promoting the effect in decomposing, sterilizing and separating the fractionated substances with respect to the water. It was ascertained that the relation between the quantity of generated hydrogen and frequency was qualitatively identical with that between the ORP and frequency.

The frequencies $F_L$, $F_H$ of various kinds of liquids to be treated are as follows.

|  | $F_L$ (Hz) | $F_H$ (KHz) |
| --- | --- | --- |
| Underground water | 10 | 310 |
| City water | 70 | 170 |
| Paint treatment liquid | 30 | 210 |
| Unused deep frying oil | x | 62 |
| Oxidized deep frying oil | x | 17 |

Since the frequencies at which the cleaning effect and field effect are produced thus differ depending upon the kind of liquids to be treated, an optimum wastewater treatment apparatus for these liquids to be treated is necessarily designed.

Figure 3:
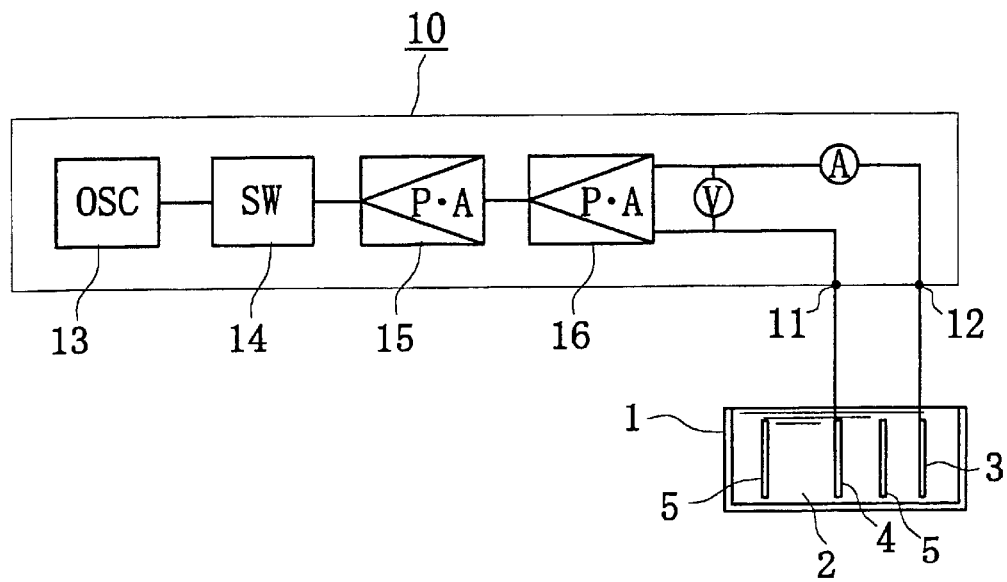
FIG. 3 is a block diagram of an electric circuit of another embodiment.

Another embodiment of the present invention will now be described. FIG. 3 is a block diagram of an electric circuit of this embodiment. In this embodiment, third electrodes are added to first and second electrodes, and the construction of the remaining portion of the embodiment is identical with that of the corresponding portion of the previously-described embodiment. An electrode structure includes a first electrode 3, a second electrode 4 and third electrodes 5, and the third electrodes 5 are merely submerged in a liquid in which the first and second electrodes 3, 4 are placed, i. e. the third electrodes are provided in a non-connected state. When an Al/Mg electrode and a titanium electrode are used as the first electrode 3 and second electrode 4 respectively in, for example, an apparatus for treating environment contamination waste water, Al/Mg electrodes identical with the first electrode 3 are used as the third electrodes 5. When an electric current is supplied to the first and second electrodes 3, 4, the third electrodes are dissolved to generate hydrogen even if an electric current is not supplied to the third electrode 5. As a result, it was ascertained that the oxidation-reduction potential and oxidation potential were varied greatly to cause the water treatment efficiency to increase by 30%.

Figure 4:
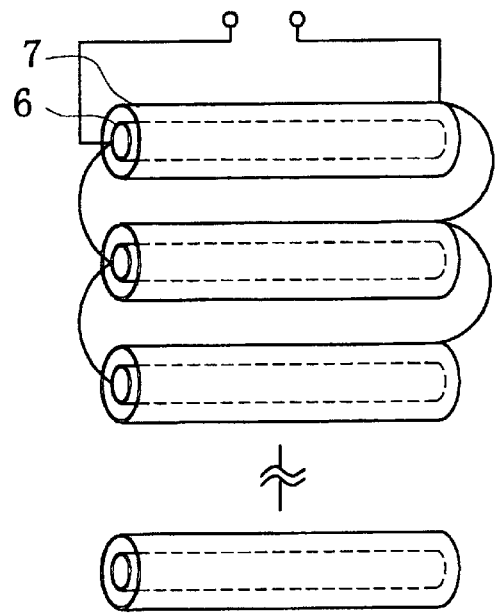
FIG. 4 is a diagram showing an electrode structure of double pipes.

The electrodes used are plate type electrodes, or single or multiple, coaxial pipe type electrodes, and the metals of which the electrodes are to be made can be selected among various kinds of metals depending upon the kind of water to be treated. The properties of metal ions and electric chemical reaction of, for example, titanium, platinum, palladium, iridium, carbon, aluminum, magnesium, zinc, copper, silver, etc. are utilized. FIG. 4 shows an electrode structure of double pipes, and each double pipe electrode includes an inner pipe 6 and an outer pipe 7. These pipe electrodes have a large area of opposed surfaces, and can reduce the impedance to a low level. In the example of FIG. 4, plural double pipe electrodes are parallel-connected to form a structure adapted to further reduce the impedance.

Figure 5:
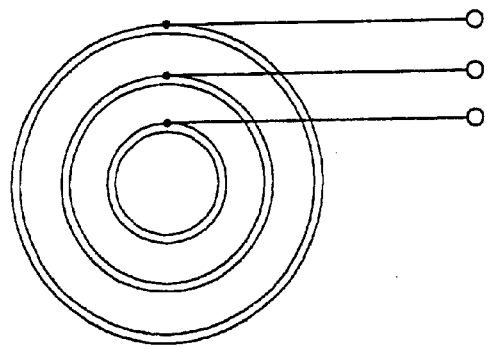
FIG. 5 is a diagram showing modified examples of multiple, coaxial pipe type electrodes.
Figure 5:
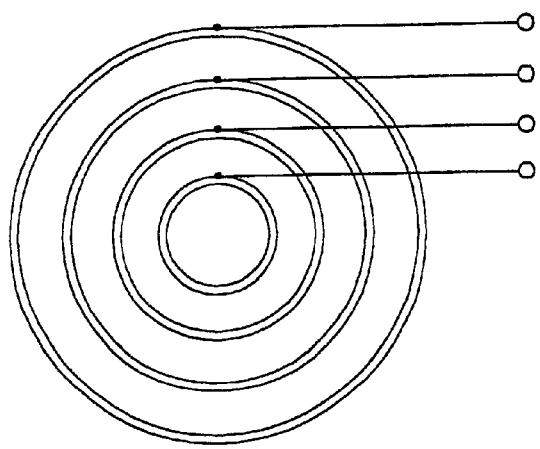
Figure 5:
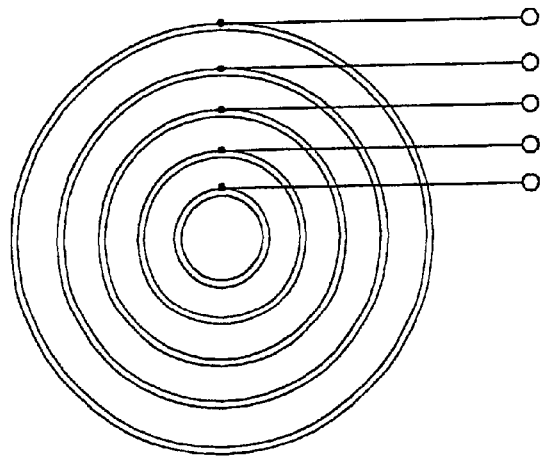

FIG. 5 shows modified examples of multiple, coaxial pipe type electrodes. Various types of coaxial pipe type electrodes including a triple, coaxial pipe type electrode (FIG. 5A), a quadruple, coaxial pipe type electrode (FIG. 5B)and a quintuple, coaxial pipe type electrode (FIG. 5C) can be formed simply by varying the diameter of the pipes. Using such multiple, coaxial pipe type electrodes is specially effective for treating an aqueous solution of a low electric conductivity, for example, an oil, pure water, superpure water, etc., and enables the electrolysis of an aqueous solution of a low temperature to be conducted efficiently.

Copper, silver, platinum, zinc, aluminum, magnesium, titanium, etc. can preferably be selected as materials for the coaxial pipe type electrodes.

What is claimed is:

1. A wastewater treatment method adapted to subject a liquid to be treated to the coagulation, decomposition, sterilization and separation of impurities by utilizing an AC power source to apply an AC voltage of a predetermined frequency between a first electrode and a second electrode provided in the liquid, comprising the step of:

using a high frequency suited to the quality of the water and in a frequency band in which metal ions, hydrogen, and oxygen are dissolved into and taken out in large quantities, occurring in the AC electrolysis of the object liquid at the frequency of the AC voltage, resulting in an electrochemical reaction, the generation of fine bubbles, and the fractionation of minute solid particles, crystals, bubbles, sludge and organisms caused by a variation in the oxidation-reduction potential and the oxidation potential, and an increase in the electric field effect (vibration effect) of the system: all promoting the removal of impurities from and sterilization of the liquid;

self-cleaning the first electrode and second electrode by using a low frequency in a frequency band in which metal ions, hydrogen and oxygen are dissolved into and taken out in large quantities, occurring in the AC electrolysis of the liquid being treated, with the effect of a large variation in the oxidation-reduction potential and oxidation potential while self-cleaning the electrodes, said AC voltage of high frequency for treating the liquid and said AC voltage of low frequency for self-cleaning the electrodes being switched from one to the other in a predetermined cycle, the resultant AC voltage being applied between the first and second electrodes.

2. A wastewater treatment method according to claim 1, wherein, when the liquid to be treated is underground water, a frequency in the vicinity of 310 KHz is used.

3. A wastewater treatment method according to claim 1, wherein, when the liquid to be treated is citywater, a frequency in the vicinity of 170 KHz is used.

4. A wastewater treatment method according to claim 1, wherein a third electrode is provided in a non-connected state in the liquid to be treated.

5. The method of claim 1 wherein said high frequency is in the range of 70–310 KHz and said low frequency is in the range of 10–70 Hz.

6. A wastewater treatment apparatus adapted to subject a liquid to be treated to the coagulation, decomposition, sterilization and separation of impurities by applying an AC voltage of a predetermined frequency between a first electrode and a second electrode provided in the liquid to be treated, and thereby causing an AC field to work on the object liquid, comprising:

an AC power source for generating an AC voltage set in accordance with the predetermined frequency, and a control unit for applying between the first and second electrodes an AC voltage of a high frequency suited to the quality of the water and in a frequency band in which metal ions, hydrogen, and oxygen are dissolved into and taken out in large quantities, occurring in the AC electrolysis of the object liquid, an AC field based on the AC voltage of a high frequency being applied to the object liquid to thereby generate fine bubbles, fractionate impurities including minute fine particles, crystals, sludge and organisms, and promote the decomposition, sterilization and separation of the resultant impurities with respect to the water.

said control unit also adapted to apply to the first and second electrodes an AC voltage of low frequency for self-cleaning said electrodes in a frequency band in which metal ions, hydrogen, and oxygen are dissolved into and taken out in large quantities, occurring in the AC electrolysis of the liquid being treated, with the effect of a large variation in the oxidation-reduction potential and oxidation potential while self-cleaning the electrodes, said AC voltage of high frequency for treating the liquid and said AC voltage of low frequency for self-cleaning the electrodes being switched by the control unit from one to the other in a predetermined cycle, the resultant AC voltage being applied between the first and second electrodes.

7. A wastewater treatment apparatus according to claim 6, wherein, when the liquid to be treated is underground water, said control unit is adapted to apply between said first and second electrodes an AC voltage with a frequency in the vicinity of 310 KHz.

8. A wastewater treatment apparatus according to claim 6, wherein, when the liquid to be treated is city water, said control unit is adapted to apply between said first and second electrodes an AC voltage with a frequency in the vicinity of 170 KHz.

9. A wastewater treatment apparatus according to claim 6, wherein the first and second electrodes are formed of multiple, coaxial pipe electrodes.

10. A wastewater treatment apparatus according to claim 6, wherein a third electrode is provided in a non-connected state in the liquid to be treated.

* * * * *